United States Patent
Duthel

(10) Patent No.: US 9,735,876 B2
(45) Date of Patent: Aug. 15, 2017

(54) CALIBRATING AN APPARATUS SUPPORTING PLUGGABLE OPTICS

(71) Applicant: Cisco Technology, Inc., San Jose, CA (US)

(72) Inventor: Thomas Duthel, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 14/796,787

(22) Filed: Jul. 10, 2015

(65) Prior Publication Data
US 2017/0012709 A1    Jan. 12, 2017

(51) Int. Cl.
*H04B 10/07* (2013.01)
*H04B 10/40* (2013.01)

(52) U.S. Cl.
CPC .................. *H04B 10/40* (2013.01)

(58) Field of Classification Search
None
See application file for complete search history.

(56) References Cited

U.S. PATENT DOCUMENTS

| | | | |
|---|---|---|---|
| 7,889,988 B2 | 2/2011 | Tazawa et al. | |
| 8,660,424 B2 * | 2/2014 | Achkir | H04L 43/50 398/135 |
| 8,750,710 B1 * | 6/2014 | Hirt | H04B 10/25751 398/135 |
| 9,438,350 B1 * | 9/2016 | Schmidt | H04B 10/50 |
| 2006/0095222 A1 | 5/2006 | Reintjes et al. | |
| 2011/0164883 A1 * | 7/2011 | Hudgins | H04B 10/40 398/141 |
| 2014/0056593 A1 | 2/2014 | DeAndrea et al. | |

OTHER PUBLICATIONS

Painchaud, Yves et al., Performance of balanced detection in a coherent receiver, Optics Express, vol. 17, No. 5, Mar. 2, 2009, pp. 3659-3672, Optical Society of America, Washington, DC, United States.

* cited by examiner

*Primary Examiner* — Tesfaldet Bocure
(74) *Attorney, Agent, or Firm* — Patterson + Sheridan, LLP

(57) ABSTRACT

Embodiments of the present disclosure provide techniques and an apparatus for partitioning calibration data into line card and pluggable properties and processing the partitioned data using a processor of the line card. For example, calibration information corresponding to components in the pluggable module may be stored on the pluggable module and transferred from the pluggable optical module to the processor on the line card. The processor may combine the calibration information received from the optical module with calibration information corresponding to properties on the line card to obtain system calibration information. The system calibration information may be used to configure one or more components used to process electric signals sent to or received from the optical module.

14 Claims, 6 Drawing Sheets

CALIBRATING AN APPARATUS SUPPORTING PLUGGABLE OPTICS

TECHNICAL FIELD

Embodiments presented in this disclosure generally relate to pluggable optics, and more specifically, to calibration data processing for pluggable optics.

BACKGROUND

Optical transmission devices are used as a means for communicating data for different networks. Communication carriers that use optical transmission devices may prefer using line cards that support pluggable optical modules. The pluggable optical modules may be connected to the line card via an analog electrical high-speed interface. Line cards that support pluggable optical modules reduce repair cost by making it possible to replace only the optical module in the event that the optical module experiences a failure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
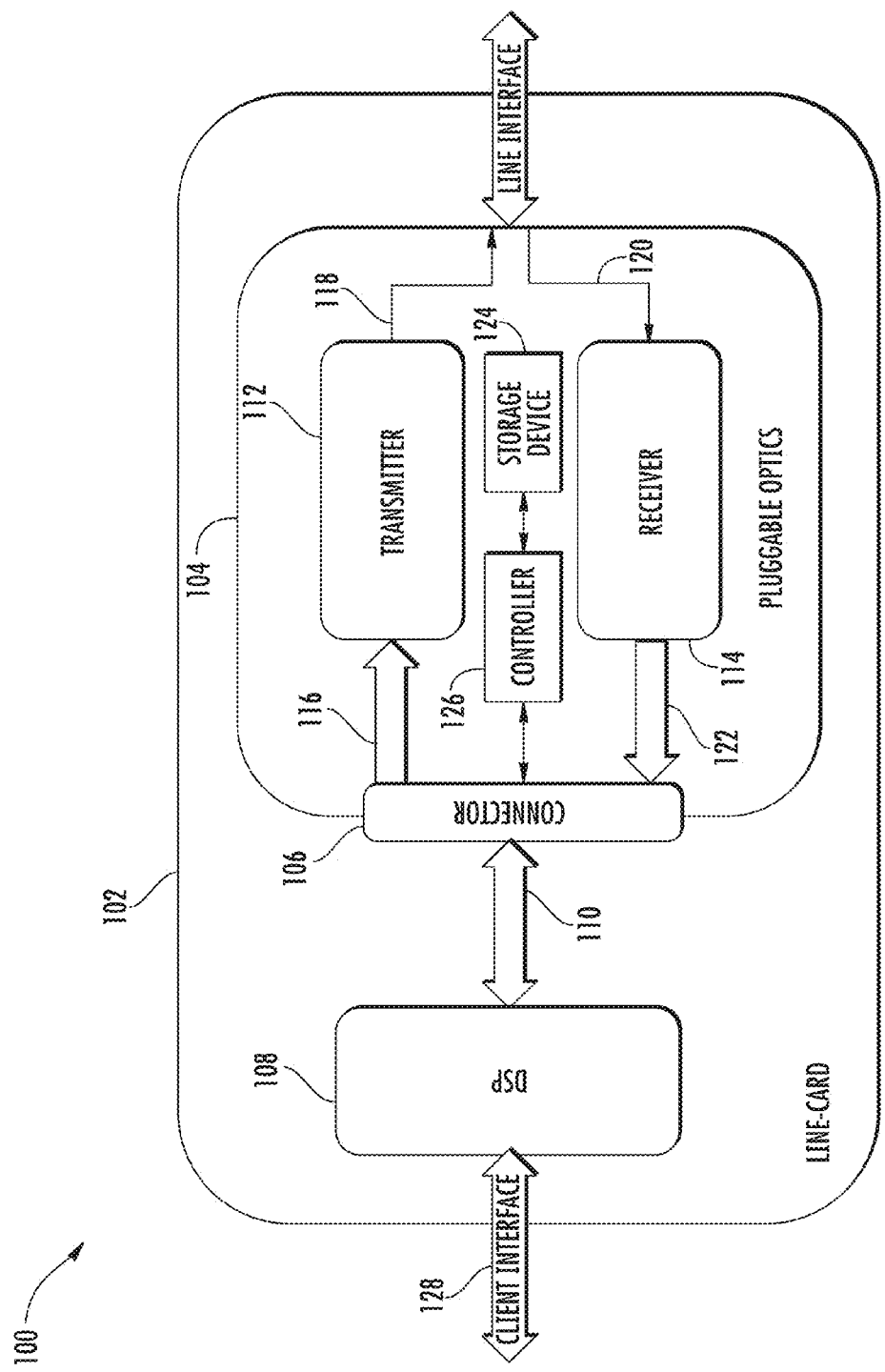
FIG. 1 is a block diagram of an optical system having a line card and a pluggable optical module, in accordance with certain embodiments of the present disclosure.

One embodiment presented in this disclosure is an apparatus. In certain embodiments, the apparatus generally includes an electrical connector configured to connect an optical module to the apparatus; and a processor configured to: receive, from the optical module via the electrical connector, first calibration information corresponding to a first plurality of elements of a communication channel between the apparatus and an optical output of the optical module; combine the first calibration information with second calibration information to obtain system calibration information, the second calibration information corresponding to a second plurality of elements of the communication channel; calibrate one or more components configured to process electrical signals based on the system calibration information.

One embodiment presented in this disclosure is a pluggable optical module. In certain embodiments, the optical module generally includes at least one storage device comprising calibration information corresponding to a plurality of elements of a communication channel between an apparatus and an optical output of the optical module, wherein the optical module is configured to plug into a port of the apparatus; and a controller configured to: determine that the optical module has been connected to the apparatus; and transfer the calibration information from the optical module to the apparatus; and a transmitter configured to: receive an electrical signal from the apparatus, wherein one or more components configured to generate the electrical signal are calibrated based on the calibration information; and generate an optical signal based on the electrical signal from the apparatus.

One embodiment presented in this disclosure is a method. In certain embodiments, the method generally includes receiving first calibration information corresponding to a first plurality of elements of a communication channel between an apparatus and an optical output of an optical module, wherein the optical module is pluggable into the apparatus; combining the first calibration information with second calibration information to obtain system calibration information, the second calibration information corresponding to a second plurality of elements of the communication channel; and calibrating one or more components configured to process an electrical signal based on the system calibration information.

Example Embodiments

Line cards may require calibration of interfaces (e.g., communication channels) between a processor (e.g., a digital signal processor (DSP)) and the optical components (e.g., optical transmitter and receiver) to ensure high optical signal-to-noise ratio (OSNR) performance. This may be especially true for certain applications (e.g., long haul or metro applications) which may require high OSNR performance.

Line-cards supporting pluggable optics may rely on different calibration concepts compared to line cards that have a processor and optical components mounted on the same printed circuit board (PCB). For line cards that do not support pluggable optics, the line card may be initially calibrated (e.g., during manufacturing) based on calibration properties of the line card, which take into account the properties of the optical components integrated into the line card. For example, the calibration of these line cards may include all high speed electrical and optical components on the line card. So long as these components are not removed and replaced, the calibration data of the line card is valid for the line card's lifetime.

However, for a line card supporting pluggable optical modules, the processor may be on the line card and the optical components may be on a modular (e.g., pluggable) optical module. In other words, architectures supporting pluggable modules may be designed for an independent installation of the line cards and the pluggable modules, and facilitate an exchange of the pluggable modules during operation. The optical module may be a separate component from the line card and connects to the line card via one or more connectors. Consequently, during the manufacturing of the line card, it may not be possible to calibrate line cards and the pluggable modules together.

Embodiments of the present disclosure provide techniques and apparatus for partitioning calibration information (e.g., calibration data) into line card and pluggable optical module properties and the processing of the partitioned calibration information by a processor of the line card. For example, calibration information (e.g., skew, frequency response limitations, and non-linear degradations) may be transferred from the pluggable optical module to the line card during start-up or when connecting an optical module to the line card. Calibration information partitioned into line card properties and properties of the pluggable optical module may be combined by the processor in order to obtain calibration information for the entire system.

For example, calibration information corresponding to components of the pluggable module may be stored (e.g., in memory) on the pluggable optical module and transferred from the pluggable optical module to the processor on the line card after connecting the pluggable module into the line card. The processor on the line card may then combine the calibration information received from the optical module with calibration information corresponding to properties of components on the line card to obtain system calibration information. The calibration information for the line card and the pluggable module may be combined at each start, reset, or insertion of the pluggable module into the line card.

The system calibration information may then be used to calibrate components used to send and receive electric signals to and from the optical module for optical transmission and reception. For example, the system calibration information may be used to calibrate the processor (e.g., DSP) on the line card. This may entail adjusting one or more parameters used to generate a digital output of the DSP, which may be converted to an analog output to the optical module via a digital to analog converter (DAC). The system calibration information may also be used to adjust one or more parameters used to equalize an input to the DSP, which may be converted from an analog output signal of the optical module via an analog to digital converter (ADC)

Figure 2:
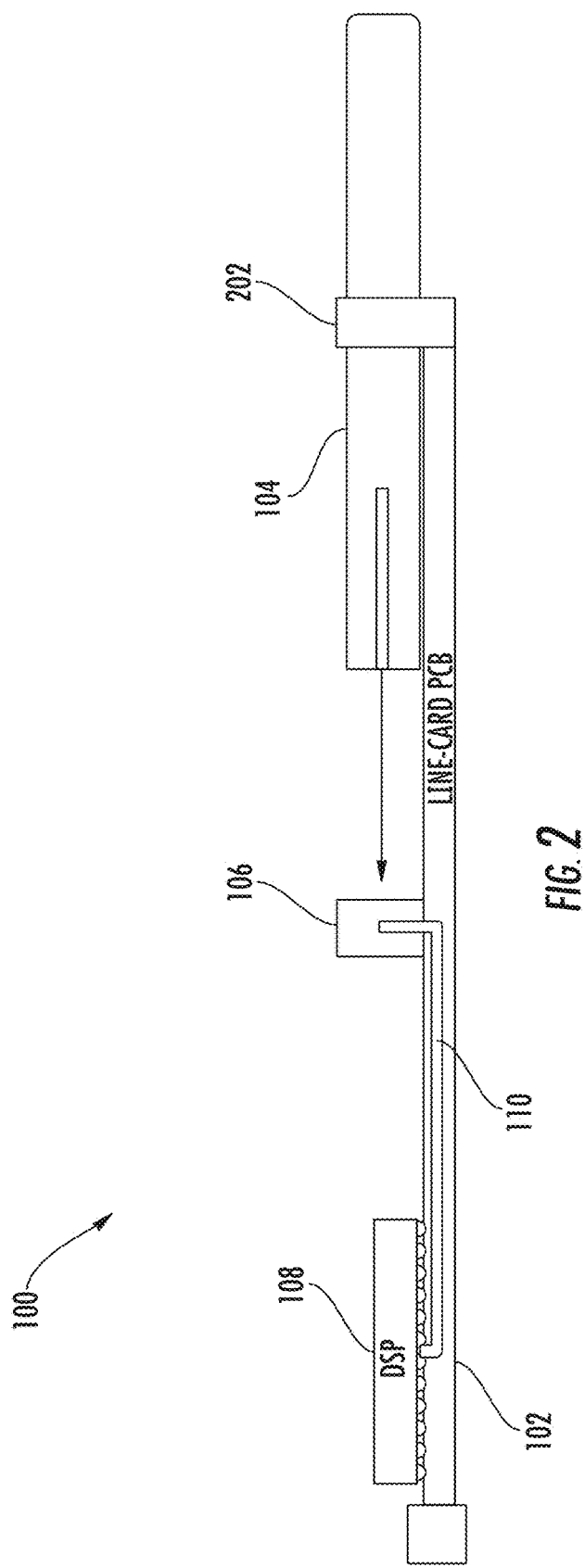
FIG. 2 is a side view of the optical system of FIG. 1 illustrating the connection of the pluggable optical module to the line card, in accordance with certain embodiments of the present disclosure.

FIG. 1 illustrates an optical system 100 having a line card 102 and a pluggable optical module 104 (e.g., an analog coherent optics (ACO) module), in accordance with certain embodiments of the present disclosure. The pluggable optical module 104 is connected to the line card 102 via a connector 106. For example, as illustrated in FIG. 2, the optical module 104 may slide into a slot 202 and connect to the line card 102 PCB via connector 106. The line card 102 may include a processor 108 (e.g., a DSP) which may communicate with the optical module 104 via an electrical interface 110), through the connector 106. As used herein, a processor may include a processing system including one or more processors, and each processor may include at least one processor core.

As illustrated in FIG. 1, the optical module 104 includes a transmitter 112 for transmitting optical signals based on electrical signals received from a processor 108. The electrical signals may be received via the electrical interface 110 and the electrical interface 116 (e.g., high-speed electrical interface), through the connector 106. The optical signals may be transmitted by the transmitter 112 via an optical interface 118. In one embodiment, the transmitter includes a transducer for converting the electrical signals received on the electrical interface 116 into optical signals. For example, the transmitter may include a laser and an optical modulator (e.g., a Mach Zender interformeter) that modulates a continuous wave using the electrical signals to output a corresponding optical signal.

Moreover, the optical module 104 includes a receiver 114 for receiving optical signals via an optical interface 120. The receiver 114 may include a transducer that converts the received optical signals into electrical signals. The receiver 114 transmits the electrical signals to the processor 108 via an electrical interface 122 and electrical interface 110 (which in combination form a high-speed electrical interface), through the connector 106.

The optical module 104 includes a storage device 124 for storing calibration information corresponding to one or more elements of a communication channel between the processor and an output of the optical module 104. The communication channel as referred to herein includes components of the line card 102 and the optical module 104, as well as traces, which may impact signal transmission and reception. For example, these elements may include traces and components of the optical module, such as electrical interface 116, electrical interface 122, or one or more components of the transmitter 112 and/or receiver 114. In some cases, the elements may also include traces and components of the line card 102.

A controller 126 may detect when the pluggable module 104 has been connected to the line card 102 (e.g., via connector 106) and transfer the calibration information stored in the storage device 124 to the processor 108. Alternatively, the processor 108 may detect that the pluggable module 104 has been connected to the line card 102, and send a request for the calibration information to the pluggable module 104. Based on the request from the processor 108, the pluggable module may transfer the calibration information stored in the storage device 124 to the processor 108. The processor 108 then combines the calibration information received from the optical module 104 with calibration information corresponding to elements of the line card 102, to obtain system calibration information. For example, the processor 108 may obtain the line card calibration information from another storage device (not shown) that may be on the line card 102. The processor 108 may then calibrate (e.g., configure) components used to process electrical signals based on the system calibration information. For example, the processor 108 may calibrate components used to generate electrical signals that are sent, via the connector 106, to the optical module 104 which are then used to generate optical signals. In certain embodiments, the calibration information may be used to calibrate components in the processor 108 used to process signals received from the optical module 104.

In other embodiments, there may be multiple processors, where one processor receives the calibration information from the pluggable module and generates the system calibration information and another processor (e.g., processor 108) generates and receives signals for transmission and reception via the pluggable module, respectively. Thus, the processor that generates the system calibration information may use the system calibration information to calibrate processor 108.

As illustrated, the processor 108 may be coupled with a client interface 128. The client interface 128 may be used to receive signals, which the processor may use for signal transmission via the optical module 104. In some cases, signals received by the line card 102, from the optical module 104, may be communicated with a client via the client interface 128.

Figure 3:
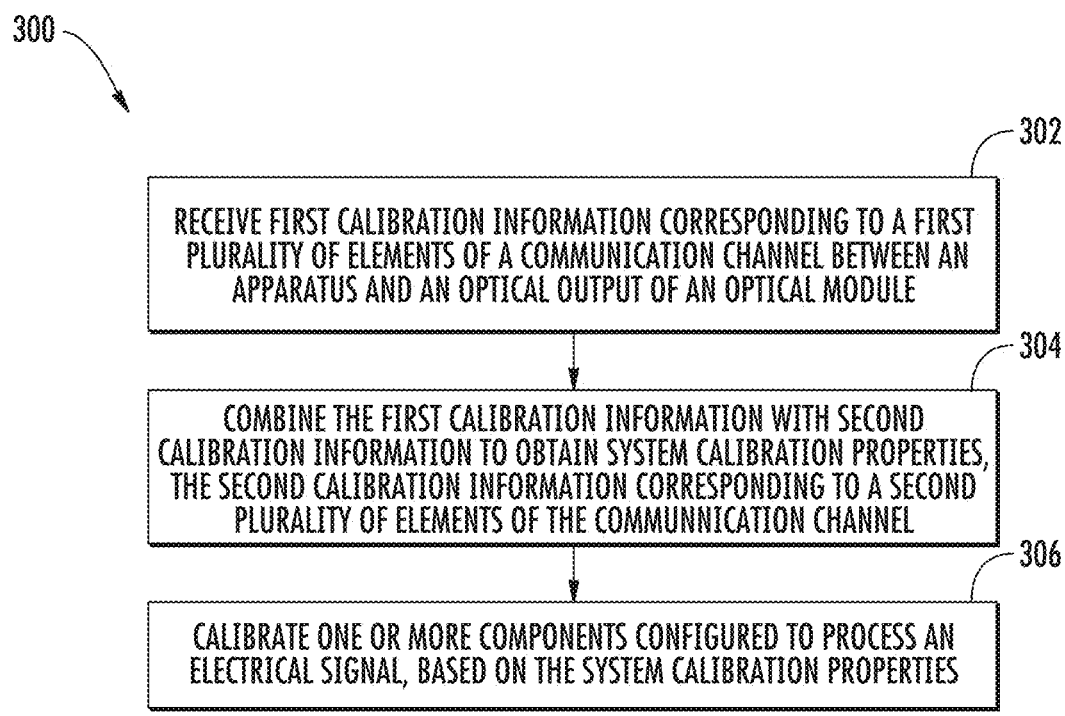
FIG. 3 is a flow diagram illustrating example operations for calibration data processing, in accordance with certain embodiments of the present disclosure.

FIG. 3 illustrates example operations 300 for calibration data processing, in accordance with certain embodiments of the present disclosure. The operations 300 may be performed, for example, by the processor 108 of the line card 102.

The operations 300 begin, at 302, by receiving a first calibration information corresponding to a first plurality of elements of a communication channel between an apparatus (e.g., processor 108) and an optical input and output of the an optical module 104. The first calibration information may be stored on a storage device 124 of the optical module 104, and sent to the processor 108 by a controller 126 once the optical module 104 has been connected to the line card 102, for example. In certain embodiments, the controller 126 may send the first calibration information to the processor 108 upon receiving a request from the processor for the first calibration information.

In some cases, the first plurality of elements may include only elements (e.g., components or traces) that are a part of the optical module 104. For example, the first plurality of elements may include one or more of the electrical interface 116, the electrical interface 122, modulator driver, modulator, trans-impedance amplifier (TIA) and photo-detectors, which are a part of the optical module 104. However, in other cases, the first plurality of elements may also include one or more elements of the line card 102. For example, the first plurality of elements may include at least a portion of the electrical interface 110.

At 304, the processor combines the first calibration information with second calibration information to obtain system calibration information. The second calibration information may correspond to second plurality of elements of the communication channel. In some cases, the second plurality of elements may include only elements (e.g., components or traces) that are a part of the line card 102. For example, the second plurality of elements may include one or more of the electrical interface 110, analog-to-digital converter, digital-to-analog converter, electrical waveguide, interposer, and packages, which may be part of the line card.

However, in other cases, the second plurality of elements may also include one or more elements of the optical module 104. For example, the second plurality of elements may include at least a portion of the electrical interface 116 and/or electrical interface 122.

In certain embodiments, either the first plurality of elements, or the second plurality of elements may include the connector 106 used to connect the optical module 104 with the line card 102. In one embodiment, the second calibration information is stored on the line card and does not include any calibration information for elements on the optical module.

The system calibration information may be used to counteract adverse effects of the elements of the communication channel. For example, at 306, the processor 108 calibrates one or more components configured to process an electrical signal, based on the system calibration information. For example, the system calibration information may be used to calibrate the processor 108 (e.g., DSP) as described above. In some cases, once the components (e.g., the processor) have been calibrated, the processor sends the signal via the connector 106 to the optical module 104, wherein the electrical signal causes the optical module to generate an optical signal.

In other cases, the components (e.g., the processor on the line card) may be calibrated for reception of signals by the line card 102 from the optical module 104. For example, as described above, one or more parameters of linear or non-linear equalizers applied to a signal received from the optical module may be adjusted based on the system calibration information.

In general, the properties that are subject to calibration may include skew between signal tributaries, transmit or receive chain frequency response, and transmit or receive chain non-linear properties (e.g., non-linear distortion), for example. The skew (e.g., represented by time delays) between signal tributaries may be impacted by different lengths of high speed interfaces (transmission lines). For example, each of electrical interfaces 110, 116, 112 may include a plurality of independent high speed communicate lanes. Thus, the processor may be configured to compensate for the skew between these lanes. The skew may also be impacted by different delays in active and passive components. These components may include modulator drivers, modulators, trans-impedance amplifiers (TIA), digital to analog converters (DAC) and analog-to-digital converters (ADC). Moreover, these components and transmission lines may impact the frequency response of signal transmissions. The frequency response may be represented by frequency resolved (e.g., amplitude and phase information or real and imaginary components). Non-linear properties may also be caused by the active and passive components in the optical module 104 or line card 102. These non-linear properties may be represented by the position of complex valued constellation positions (e.g., stored in a look-up table or described by a polynomial) or non-linear system identification (e.g. stored in a look-up table with memory, or described by a Volterra series or memory polynomial).

Figure 4:
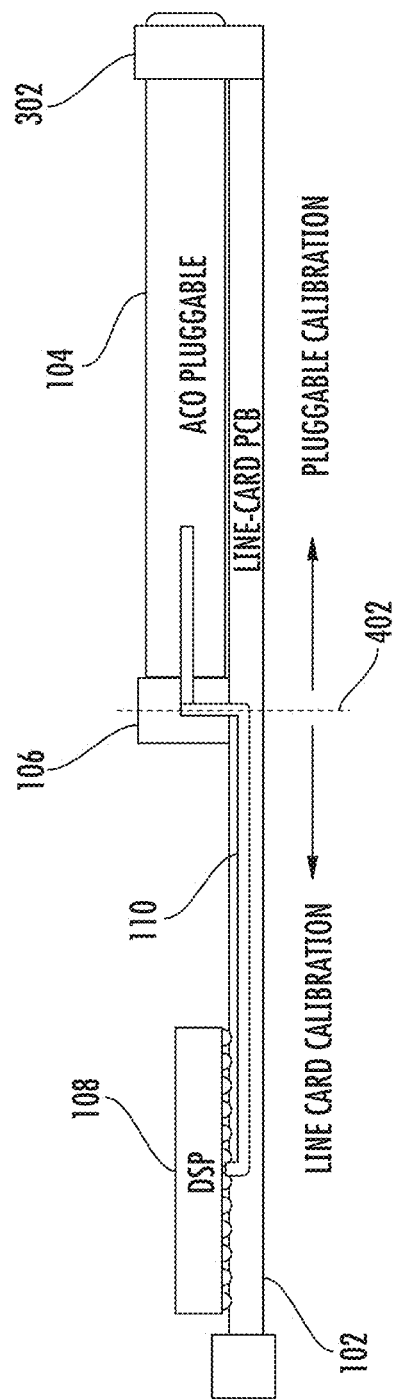
FIG. 4 is a side view of the optical system of FIG. 1 illustrating a calibration plane dividing elements assigned to the line card and optical module, in accordance with certain embodiments of the present disclosure.

FIG. 4 illustrates a side view of the optical system 100 of FIG. 1, according to certain embodiments of the present disclosure. As presented above, each of the line card 102 and the optical module 104 may be assigned one or more elements of a communication channel. The line card 102 and the optical module 104 store calibration information corresponding to their respective assigned elements. For example, as illustrated, a calibration plane 402 divides the elements assigned to the line card 102 and the elements assigned to the optical module 104. That is, in this example, all the elements to the left of the calibration plane 402 are assigned to the line card 102, and the elements to the right of the calibration plane 402 are assigned to the optical module 104. As a result, calibration information for the electrical interfaces 116 and 122, modulator, TIA, photo-detectors, etc. in the optical module 104 are stored in a memory (e.g., storage device 124) on the optical module 104. In contrast, the calibration information for converters (ADCs and DACs) in the processor 108, the electrical interface 110, etc. in the line card 102 are stored in a memory in the line card 102. Thus, when the optical module 104 is plugged into connector 106, the optical module 104 transfers its calibration information (i.e., the first calibration information referenced in FIG. 3) to the processor 108.

Figure 5:
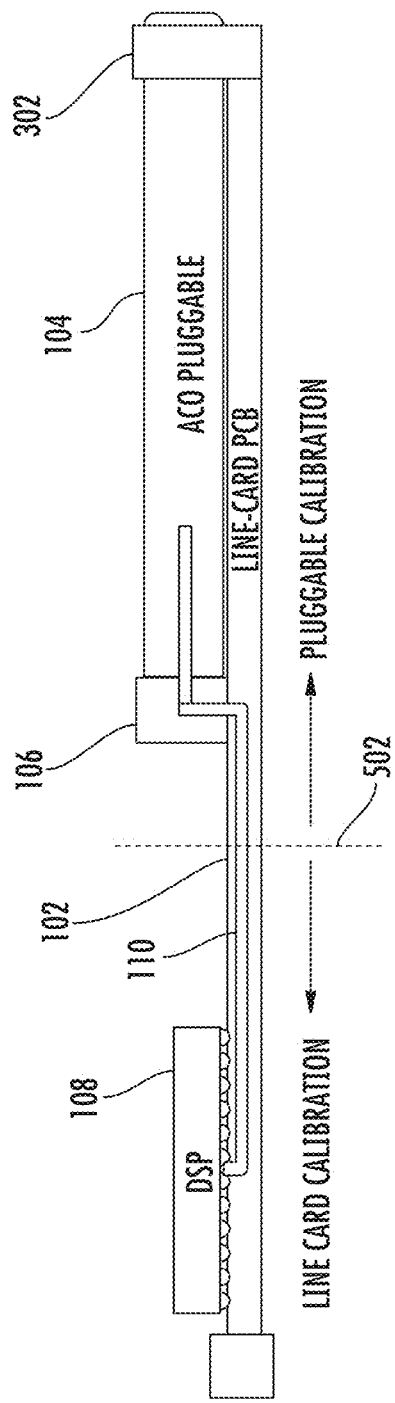
FIG. 5 illustrates the calibration plane of FIG. 4 offset towards a processor of the line card, in accordance with certain embodiments of the present disclosure.

FIG. 5 illustrates a side view of the optical system 100 of FIG. 1 with the calibration plane 502 offset towards the processor 108, according to certain embodiments of the present disclosure. In this case, according to the calibration plane 502 of FIG. 5, the elements assigned to the optical module include, in addition to all components and traces in the optical module, the connector 106 and a portion of the electrical interface 110 of the line card 102. Moreover, calibration information stored in the memory (e.g., storage device 124) includes not only the components of the optical module, but also at least some of the components of the line card. As presented above, these components may include analog-to-digital converters (ADC), digital-to-analog converters (DAC), electrical waveguides, interposers, and packages. In addition, in this case, calibration information corresponding to the connector 106 would be stored in the optical module (e.g., in storage device 124), and not the line card 102. Therefore, the line card 102 may rely on the optical module to provide the calibration information corresponding to the elements assigned to the optical module.

Figure 6:
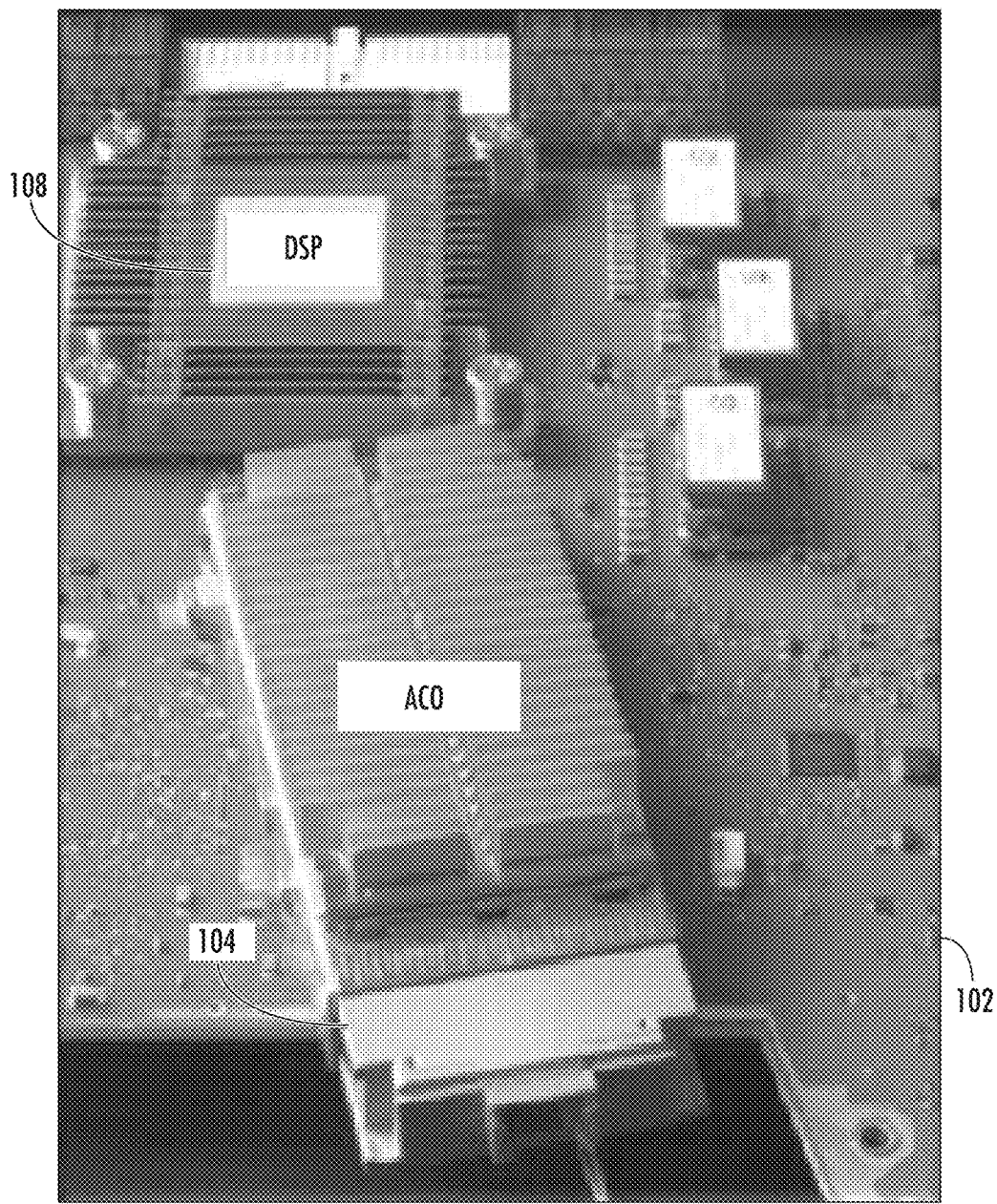
FIG. 6 illustrates an optical system having a line card and a pluggable optical module, in accordance with certain embodiments of the present disclosure.

FIG. 6 illustrates the line card 102 and the pluggable optical module 104 (e.g., ACO module) of the system 100 of FIG. 1, according to certain embodiments of the present disclosure. As illustrated, the line card 102 may include a DSP 108 which generates system calibration information using calibration information received from the optical module 104. As illustrated, the line card 102 and the optical module 104 include radiators (i.e., heat sinks) that block the view of the DSP 108 and other components of the line card 102 and the optical module 104.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As used herein, a component that is configured to perform a recited function, means that the component that carries out the recited functions is fully equipped with the requisite hardware and programming to carry out those functions in response to predefined inputs. In other words, the configured component does not require further modifications or human operator involvement to carry out the functions. These recited functions are attributes that inherently characterize the component, as compared to what the component could be manipulated to perform.

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. An apparatus, comprising:
    an electrical connector configured to connect an optical module to the apparatus; and
    at least one processor configured to:
        receive, from the optical module via the electrical connector, first calibration information corresponding to a first plurality of elements of a communication channel between the apparatus and an optical input and output of the optical module;
        combine the first calibration information with second calibration information to obtain system calibration information, the second calibration information corresponding to a second plurality of elements of the communication channel;
        calibrate one or more components configured to process electrical signals based on the system calibration information.

2. The apparatus of claim 1, wherein the first plurality of elements and the second plurality of elements are assigned to the optical module and the apparatus, respectively, based on a partition of the communication channel.

3. The apparatus of claim 1, wherein the communication channel comprises an electrical interface between the processor and the electrical connector, wherein the first plurality of elements comprises the electrical connector and at least a portion of the electrical interface.

4. The apparatus of claim 1, wherein the second plurality of elements comprises an element of the optical module.

5. The apparatus of claim 4, wherein the second plurality of elements comprises the electrical connector and at least a portion of an electrical interface for an optical transmitter and an optical receiver.

6. The apparatus of claim 1, wherein the one or more components comprise the processor.

7. The apparatus of claim 1, wherein the apparatus is a line card configured to interface with a network via the optical module.

8. The apparatus of claim 1, wherein the at least one processor is further configured to send the processed electrical signals to the optical module, wherein the processed electrical signals cause the optical module to generate optical signals.

9. The apparatus of claim 1, wherein the at least one processor is further configured to receive the first calibration information from the optical module before processing the electrical signals.

10. A method, comprising:
    receiving first calibration information corresponding to a first plurality of elements of a communication channel between an apparatus and an optical input and output of an optical module, wherein the optical module is pluggable into the apparatus;
    combining the first calibration information with second calibration information to obtain system calibration information, the second calibration information corresponding to a second plurality of elements of the communication channel; and
    calibrating one or more components configured to process an electrical signal, based on the system calibration information.

11. The method of claim 10, further comprising sending the processed electrical signal via a connector to the optical module, wherein the processed electrical signal causes the optical module to generate an optical signal.

12. The method of claim 10, further comprising, before processing the electrical signal, receiving the electrical signal from the optical module.

13. The method of claim 10, wherein calibrating the one or more components comprises counteracting combined properties of the first and second pluralities of elements of the communication channel.

14. The method of claim 13, wherein the combined properties comprise at least one of skew between signal tributaries, a frequency response of the communication channel, and non-linear distortion of the communication channel.

* * * * *